United States Patent
Bewersdorf et al.

(10) Patent No.: US 6,570,705 B2
(45) Date of Patent: May 27, 2003

(54) OPTICAL ARRANGEMENT FOR ILLUMINATING OBJECTS AND DOUBLE—CONFOCAL SCANNING MICROSCOPE

(75) Inventors: Joerg Bewersdorf, Heidelberg (DE); Hilmar Gugel, Dossenheim (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/954,018

(22) Filed: Sep. 18, 2001

(65) Prior Publication Data

US 2002/0034002 A1 Mar. 21, 2002

(30) Foreign Application Priority Data

Sep. 18, 2000 (DE) .......................... 100 46 410

(51) Int. Cl.[7] ........................ G02B 21/06; G02B 21/00
(52) U.S. Cl. ................. 359/388; 359/368; 359/385
(58) Field of Search .................. 359/368–371, 359/385–390, 831–837

(56) References Cited

U.S. PATENT DOCUMENTS

| 4,805,027 A | * | 2/1989 | Sluyter |
| 4,834,529 A | * | 5/1989 | Barrett |
| 4,877,960 A | * | 10/1989 | Messerschmidt et al. |
| 5,067,805 A | * | 11/1991 | Corle et al. |
| 5,386,112 A | * | 1/1995 | Dixon |
| 5,671,085 A | | 9/1997 | Gustafsson et al. ......... 359/385 |
| 5,790,306 A | * | 8/1998 | Kleinberg et al. |
| 5,796,112 A | * | 8/1998 | Ichie |
| 5,936,764 A | * | 8/1999 | Kobayashi |
| 6,134,002 A | * | 10/2000 | Stimson et al. |

FOREIGN PATENT DOCUMENTS

| DE | 39 18 412 | * | 2/1990 |
| EP | 0 491 289 | | 6/1992 |

* cited by examiner

Primary Examiner—Thong Nguyen
(74) Attorney, Agent, or Firm—Foley & Lardner

(57) ABSTRACT

The present invention relates to an optical arrangement for illuminating objects (1), in particular fluorescent objects, preferably in conjunction with a confocal or a double-confocal scanning microscope, having an illuminating beam path (2) of a light source (3), a detection beam path (4) of a detector (5), and a component (6) which unifies the detection beam path (4). For the purpose of at least largely loss-free union of the light coming from the object (1) into a propagation direction (19), the optical arrangement according to the invention is characterized in that with reference to the beam cross section active for the detector, light of the fist and second partial detection beam can be united at least largely in an overlapping fashion into one propagation direction (19) at the component (6) thereby providing an unified the detection beam path (4).

23 Claims, 4 Drawing Sheets

OPTICAL ARRANGEMENT FOR ILLUMINATING OBJECTS AND DOUBLE—CONFOCAL SCANNING MICROSCOPE

CROSS REFERENCE TO RELATED APPLICATIONS

This invention claims priority of the German patent application 100 46 410.6 which is incorporated by reference herein.

FIELD OF THE INVENTION

The present invention relates to an optical arrangement for illuminating objects. Additionally the invention relates to a double-confocal scanning microscope.

BACKGROUND OF THE INVENTION

Devices of the generically determinative type are known in practice and are used, for example, in EP 0 491 289 or U.S. Pat. No. 5,671,085. The two printed publications disclose microscope arrangements in which an object is illuminated and/or detected with the aid of two microscope objectives arranged opposite one another. For illuminating purposes, the illuminating beam path is split into two partial beam paths such that the object can be illuminated simultaneously by light beams running oppositely relative to one another. The light of the two illuminating partial beam paths interferes in the object region, as a result of which the object can be illuminated with an improved resolution capability. The light—for example fluorescent light—coming from the object, which is collected by the microscope objectives, now traverses the illuminating partial beam paths in the opposite direction. The light coming from the object is now united at the component splitting the illuminating light, and fed partially to the detector.

The component splitting the illuminating beam path and unifying the detection beam path usually takes the form of beam splitters which are used, for example, in the form of cemented beam splitter cubes. With these components, the incident light is split in equal parts into a beam transmitted in a straight-ahead direction and a beam deflected at the angle of 90 degrees. In the case of detection light which comes from the object and is to be united at the beam splitter cube, the light of each partial beam path is split into a transmitted and a deflected partial beam such that in each case only half of each detection light beam reaches the detector. The other half of the light coming from the object cannot be detected by the detector and is therefore lost and unused.

SUMMARY OF THE INVENTION

It is therefore the object of the present invention to configure and develop an optical arrangement which allows a at least largely loss free unification of the light coming from the object to be illuminated.

The object is achieved by an optical arrangement for illuminating a fluorescent object with a confocal scanning microscope, wherein the optical arrangement includes a light source defining an illuminating beam path. The optical arrangement further includes a detector defining a detection beam path, which has a beam cross section active for the detector and encompasses light coming from the object. The optical arrangement further includes a component which splits the illumination beam path into a first and second partial illumination beam and which unifies the detection beam path, wherein the light coming from the object in a first and second partial detection beam is united at least largely in an overlapping fashion into one propagation direction at the component. The optical arrangement further includes means for influencing the phase of the light coming from the object, wherein the means is arranged at least in the first or the second partial detection beam.

It is a further object of the invention to provide a double confocal scanning microscope which allows a largely loss free combination of partial detection beams.

The above object is accomplished by a double confocal scanning microscope which includes a light source defining an illuminating beam path. The double confocal scanning microscope further includes two microscope objectives each of which being arranged on opposite sides of an object. The double confocal scanning microscope further includes a beam deflecting device for scanning the illuminating beam path across the object in two essentially right angles to one another. The double confocal scanning microscope further includes at least one detector defining a detection beam path, which has a beam cross section active for the detector and encompasses light coming from the object. The double confocal scanning microscope further includes a component which splits the illumination beam path into a first and second partial illumination beam and which unifies the detection beam path, wherein the light coming from the object in a first and second partial detection beam is united at least largely in an overlapping fashion into one propagation direction at the component. The double confocal scanning microscope further includes means for influencing the phase of the light coming from the object, wherein the means is arranged at least in the first or the second partial detection beam.

BRIEF DESCRIPTION OF THE DRAWINGS

There are various possibilities of configuring and developing the teaching of the present invention in an advantageous way. Again, generally preferred refinements and developments of the teaching are explained in conjunction with the explanation of the preferred exemplary embodiments of the invention with the aid of the drawing. In the drawing.

DETAILED DESCRIPTION OF THE INVENTION

Figure 1:
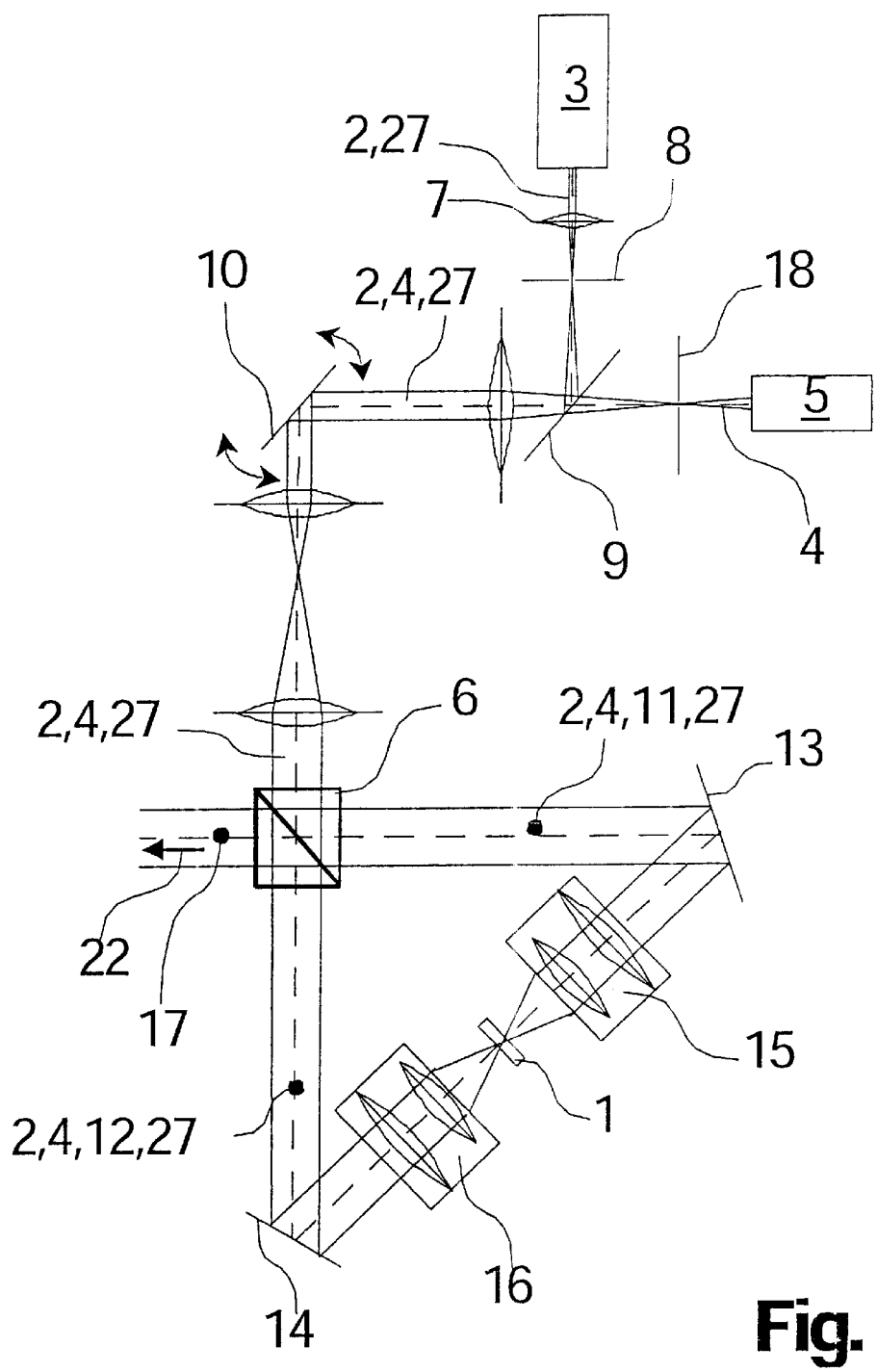
FIG. 1 shows a schematic illustration of a double-confocal scanning microscope.

According to the invention, it has firstly been realized that virtually all the detection light coming from the object in a first and second partial detection beam can be united at the component unifying the detection beam path and can be led into a propagation direction when the detection light arrives at the beam-unifying interface with a defined phase relationship, for example in phase. For this purpose, there is a need, firstly, to carry out appropriate tuning of the optical lengths of the detection beam paths to be unified, for example by means of optical paths of identical length. Furthermore, means are provided for influencing the phase of the detection light which are arranged in at least one of the first and second partial detection beams and the means are capable of compensating for phase differences in the detection partial beams. If the detection light coming from the object from the individual partial beam paths now arrives at the component unifying the detection beam path, and the phase relationship of the two detection partial beams is appropriately set, the detection light traversing the two partial beam paths interferes constructively at the component unifying the detection beam path. In an advantageous way, in the case of constructive interference, the detection light propagates only in one direction, specifically in the direction of the detector. There is, correspondingly, no propagation of light in the other direction, since destructive interference occurs for this propagation direction.

The light traversing the individual partial beam paths is usually united in this case at a region of the interface of the component which unifies the detection beam path and to which the detection light is applied from the two partial beam paths equally or at least largely in an overlapping fashion. This interface region is generally also the surface which is active for the detection or for the detector and is denoted here in this connection as an active beam cross section, which need not necessarily be orientated orthogonal to the optical axis.

Use is normally made as the component unifying the detection beam path of a base substrate which has on at least one side a metal, dielectric or metal-dielectric coating. Also used are appropriate beam splitter cubes with a metal, dielectric or metal-dielectric hybrid coating. An important role in the constructive or destructive interference at the component unifying the detection beam path is played by the phase jump, which is 180 degrees in the case of a reflection at a transition to an optically denser medium, while the phase jump is 0 degrees in the case of a reflection at a transition to an optically less dense medium, that is to say no phase jump occurs.

For the purpose of optimally uniting the beam in one propagation direction, at least one component, for example the component unifying the detection beam path, is configured and/or arranged in the beam path in such a way that it has an appropriate reflectance and/or transmittance. For one thing, this can be achieved by coating the component appropriately; an arrangement or alignment of the component is likewise provided for this purpose taking account of the Fresnel equations.

An at least largely loss-free uniting of the light coming from the object into one propagation direction is also promoted by virtue of the fact that at least one component is arranged in the beam path in such a way that the light striking this component has an appropriate angle of incidence. Snell's law of refraction is chiefly relevant for this purpose in the case of a beam splitter as the component unifying the detection beam path.

For the purpose of an at least largely loss-free union of the light coming from the object into one propagation direction, at least one component is configured and/or arranged in the beam path in such a way that it is thereby possible to achieve an appropriate phase matching. What could be involved here, for example, is a mirror which can be adjusted with nanometer accuracy over the path corresponding to a wavelength of the detection light. This renders possible an appropriate phase matching of the detection partial beam path, in which this mirror is arranged, with reference to the other detection partial beam path.

In an entirely general way, the component can be the component unifying the detection beam path. For this purpose, it would need to be appropriately coated, and so there is a need for suitable selection of the reflectance and transmittance for a given angle of incidence. It would likewise be possible to achieve a phase matching through appropriate adjustment with nanometer accuracy using the component unifying the detection beam path.

The component could be a component with a metal or dielectric coating, and/or a component which is provided with a dielectric or metal-dielectric hybrid coating. Particularly in the case of the component unifying the detection beam path, it could be a component provided with a metal-dielectric hybrid coating.

In a preferred embodiment, it is provided that the beam splitter arrangements are configured and/or arranged in the beam path in such a way that the splitting and/or recombination ratios for s- and p-polarized light are virtually equal. This is of great significance in particular when the light to be united is fluorescent light of any desired direction of polarization, since given a virtually equal combination ratio for s- and p-polarized light the targeted interference of the fluorescent light is performed very efficiently, as a result of which this uniting of the light coming from the object can be performed virtually in a loss-free fashion into one propagation direction.

A basic condition for constructive interference of the detection light to be united is largely fulfilled at least when the light traversing the two partial beam paths and coming from the object has a defined phase relationship at the interface of the component unifying the detection beam path. This defined phase relationship is chiefly dependent on the properties of the interface of the component unifying the detection beam path, and so it is provided in concrete terms to set the required, defined phase relationship. For this purpose, the optical path length of at least one of the partial beam paths can be variable. Such a variation in the optical path length could be performed with the aid of an already mentioned adjustment of a mirror arranged in a partial beam path. A further reaching phase matching, or a finer setting of the phase matching is likewise provided for with the aid of other means or other components arranged in the beam path.

The properties of the interface of the component unifying the detection beam path govern whether or not the light traversing the one partial beam path and coming from the object experiences a change in phase during its transmission of reflection. Thus, for example, the reflected fraction compared with the transmitted fraction of the light coming from the object could experience a phase jump of 180 degrees. The phase of the light traversing the other partial beam path and coming from the object could experience no variation in phase, and so a completely definite, defined phase relationship has to be set in order to achieve the largely loss-free union of the light coming from the object. This setting could be performed, for example, in such a way that the light traversing both partial beam paths and coming from the object has a phase relationship which is at least largely in phase or in phase opposition at the interface of the component unifying the detection beam path.

It is provided in a preferred embodiment to vary the optical path length of at least one partial beam path in order to influence the phase of the light traversing the partial beam paths and coming from the object.

In a preferred embodiment, a double glass wedge is provided as means for influencing the phase of the light coming from the object. This double glass wedge comprises two glass wedges arranged such that they are capable of being displaced relative to one another and whose mutually facing interfaces are filled with an immersion medium, for example oil, of suitable refractive index and suitable dispersion. The double glass wedge arranged in a partial beam path running in a collimated fashion is penetrated perpendicularly by the light running in a collimated fashion, that is to say the interface air/glass of each glass wedge is arranged orthogonal to the light beam running in a collimated fashion. When the two glass wedges are moved relative to one another transverse to the beam direction, this causes a change in the optical path length through the double glass wedge, since the air/glass interfaces have a small wedge angle relative to the glass/immersion medium interfaces. By varying the optical path length of the partial beam path in which the double glass wedge is arranged, it is possible for the phase relationship of the light traversing this partial beam path to be influenced and/or varied relative to the light of the other partial beam path.

It is provided in a further embodiment that the light running in different directions downstream of the component unifying the detection beam path and coming from the object can be detected in each case with the aid of at least one detector. It is provided in this case that the light at least largely united in one propagation direction and coming from the object is detected with the aid of a detector. The light running in another direction and coming from the object is detected with the aid of a further detector. Since the intensity or power of this detection light is to be virtually 0 in the case of an optimum union of the beam according to the invention, the signal of this detector can be used to control the phase relationship of the two detection partial beam paths. Furthermore, all the detection signals of the detectors could be used jointly for object evaluation. This mode of procedure permits optimization of the detection light yield even in the case of non-optimum union of detection light.

In a preferred embodiment, a detection pinhole diaphragm is arranged upstream of each detector. An appropriate microscope design is therefore a confocal or double-confocal scanning microscope. The detection pinhole diaphragm corresponds in this case optically to the illuminating focus of the microscope objective which, for its part, corresponds optically to an excitation pinhole diaphragm.

No detection pinhole diaphragm is arranged upstream of the detectors if detection of fluorescent light excited by multiphoton excitation processes is provided. Since multiphoton excitation processes are non-linear processes, the probability of a two-photon excitation process, for example, is proportional to the square of the level of illumination. The level of illumination in a light beam focussed by means of a microscope objective is highest at the focus of the microscope objective, as a result of which multiphoton excitation processes can be induced chiefly at the illumination focus given an adequate level of illumination. Consequently, in the case of a confocal or focussed illumination in conjunction with a multiphoton excitation of fluorescent dyes, the fluorescent light can originate with a high probability only from the focal region of the microscope objective, and so it is not required to insert a detection pinhole diaphragm for the purpose of masking out the regions outside the focal region of the microscope objective.

FIG. 1 shows an optical arrangement for illuminating objects 1 in conjunction with a double-confocal scanning microscope. The optical arrangement comprises an illuminating beam path 2 of a light source 3, a detection beam path 4 of a detector 5 and a component 6 unifying the detection beam path 4.

The illuminating light 27 of the light source 3, which light serves to illuminate the object 1, is projected via a lens 7 onto the excitation pinhole diaphragm 8. The light passing the excitation pinhole diaphragm 8 is reflected by the dichroic beam splitter 9 in the direction of a beam deflecting device 10. The beam deflecting device 10 scans the illuminating light beam 27 in two directions which are essentially at right angles to one another. The light beam reflected by the beam deflecting device 10 and scanned strikes the component 6, where it is split into a first and second partial illumination beam 11, 12. The illuminating light traversing the first and second partial illumination beams is reflected at the mirrors 13, 14 and focussed from both sides at the same object point of the object 1 via the microscope objectives 15 and 16. The reflection of the illuminating light beam 27 by the beam deflecting device 10 causes a change in location of the illumination focuses of the two microscope objectives 15, 16, and so the object 1 can be illuminated in two dimensions in the focal plane.

The object 1 (illustrated purely schematically) is specifically marked with the aid of fluorescent markers. The fluorescent light induced by the illuminating light 27, which is collected by the two microscope objectives 15, 16, traverses the first and second partial illumination beam 11, 12 in the reverse direction. This light defines a first and second partial detection beam. The fluorescent light collected by the microscope objective 15 is reflected by the mirror 13 in the direction of the component 6 unifying the detection beam path 4. A portion of this fluorescent light passes the component 6 without being deflected and emerges from the component 6 as a light beam 17. The other portion of the fluorescent light traversing the partial beam path 11 is reflected at the component 6 in the direction of the beam deflecting device 10, such that this fluorescent light can be detected in the final analysis by the detector 5. The fluorescent light collected by the microscope objective 16 is reflected by the mirror 14 in the direction of the component 6. Approximately 50% of the fluorescent light traversing the second partial illumination beam 12 is reflected out of the detection beam path 4 in the direction 22 at the component 6. The remaining fluorescent light passes the component 6 and is led in the direction of the detection pinhole diaphragm 18 via the beam deflecting device 10, the dichroic beam splitter 9. Only when fluorescent light originates from the illumination focus of the two microscope objectives 15, 16 can this fluorescent light pass the detection pinhole diaphragm 18 since, in accordance with the confocal principle, the detection pinhole diaphragm 18 is arranged in a plane corresponding optically to the illumination focus of the two microscope objectives 15, 16. In the same way, the excitation pinhole 8 is arranged in an optically corresponding plane relative to the common illumination focus of the two microscope objectives 15, 16.

The fluorescent light 17 emerging from the detection beam path 4 cannot be fed to the detector 5. Consequently, approximately 50% is lost in the detection of the fluorescent light coming from the object 1, since this lost fluorescent light cannot be detected by the detector 5.

Figure 2:
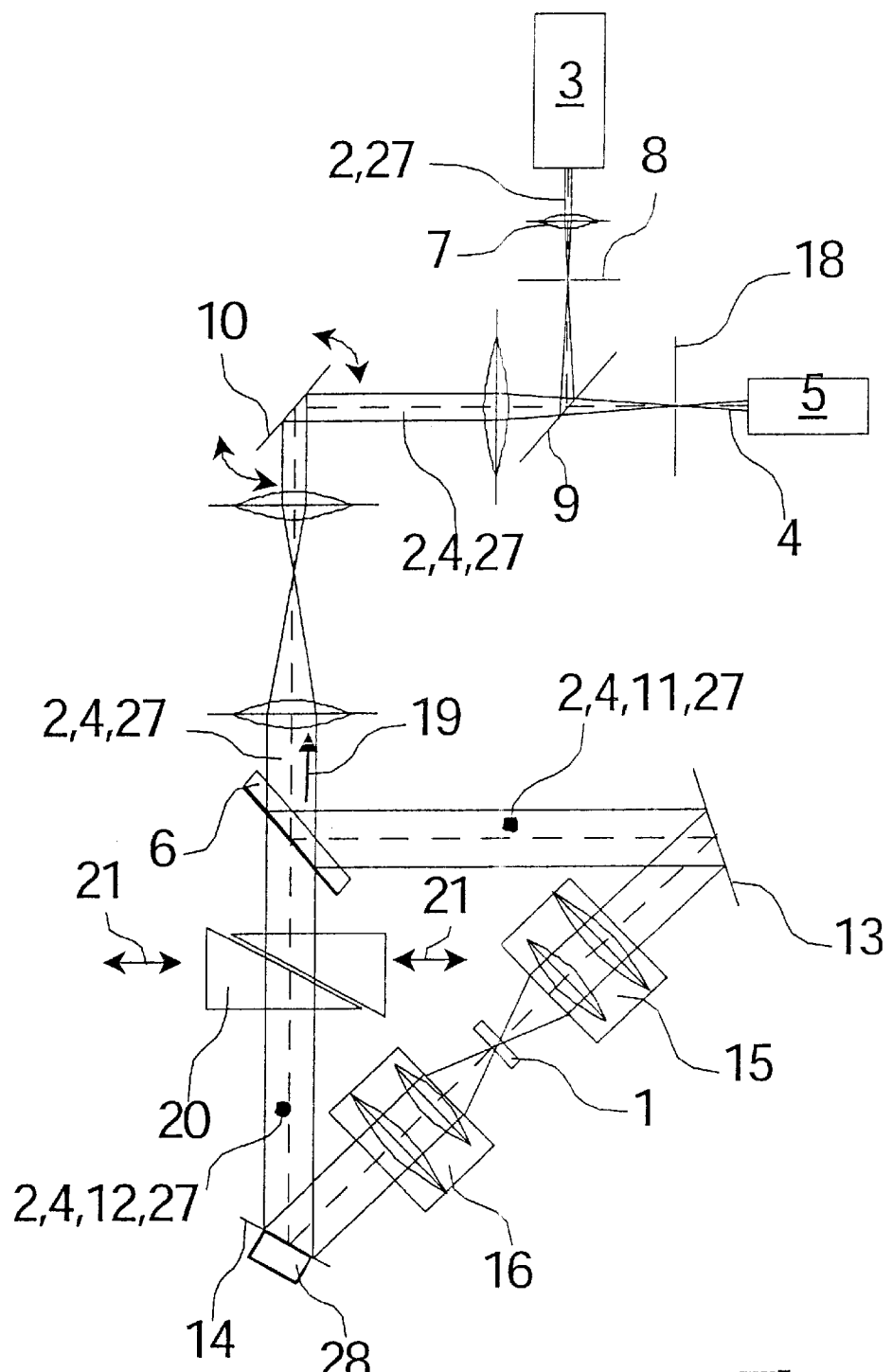
FIG. 2 shows a schematic illustration of a first exemplary embodiment of a double-confocal scanning microscope according to the invention.

According to the invention, the light coming from the object 1 is united at least largely in one propagation direction 19 by the component 6 unifying the detection beam path 4, as can be gathered from FIG. 2. In this case, means 20 are provided for influencing the phase of the light coming from the object 1, and are arranged in the partial beam path 12 of the detection beam path 4.

For the purpose of at least largely loss-free union of the light coming from the object 1 in one propagation direction 19, the component 6 in FIG. 2 is configured and arranged in the beam path 4 in such a way that it has appropriate reflectance and transmittance. For the illuminating light 27, the component 6 has a transmittance of 0.5, such that the illuminating light can be split with the same intensity into the first and second partial illumination beams 11, 12. With regard to the at least largely loss-free union of the fluorescent light, coming from the object 1, of the first and second partial illumination beam 11, 12, the component 6 is arranged in the beam path 4 in such a way that the fluorescent light traversing the first and second partial illumination beams 11 and 12 is led into the propagation direction indicated by the arrow 19. The component 6 has an angle of incidence of 45 degrees in each case with regard to the illuminating light 2 and the fluorescent light coming from the object 1.

The optical path lengths of the first and second partial illumination beam 11, 12 are co-ordinated with one another in such a way that the light traversing the first and second partial illumination beam 11, 12 and coming from the object 1 arrives at least largely in phase at the component 6. A fine adjustment of the optical path length of the two partial beam paths 11, 12 is carried out by varying the position of the mirror 14, by virtue of the fact that the mirror 14 can be displaced orthogonal to its surface by the piezoelectric element 28.

The means 20 for influencing the phase of the light coming from the object 1 is implemented in the form of a double glass wedge. The double glass wedge 20 is arranged in the second partial illumination beam 12. The light running parallel in the second partial illumination beam 12 penetrates the air/glass interfaces of the double glass wedge 20 orthogonally. Located between the two double glass wedges is immersion oil, which has virtually the same index of refraction and the same dispersion as the glass of the two glass wedges. The two glass wedges of the double glass wedge 20 can be displaced relative to one another along the direction 21, and so it is possible thereby to vary the optical path length of the double glass wedge.

Figure 3:
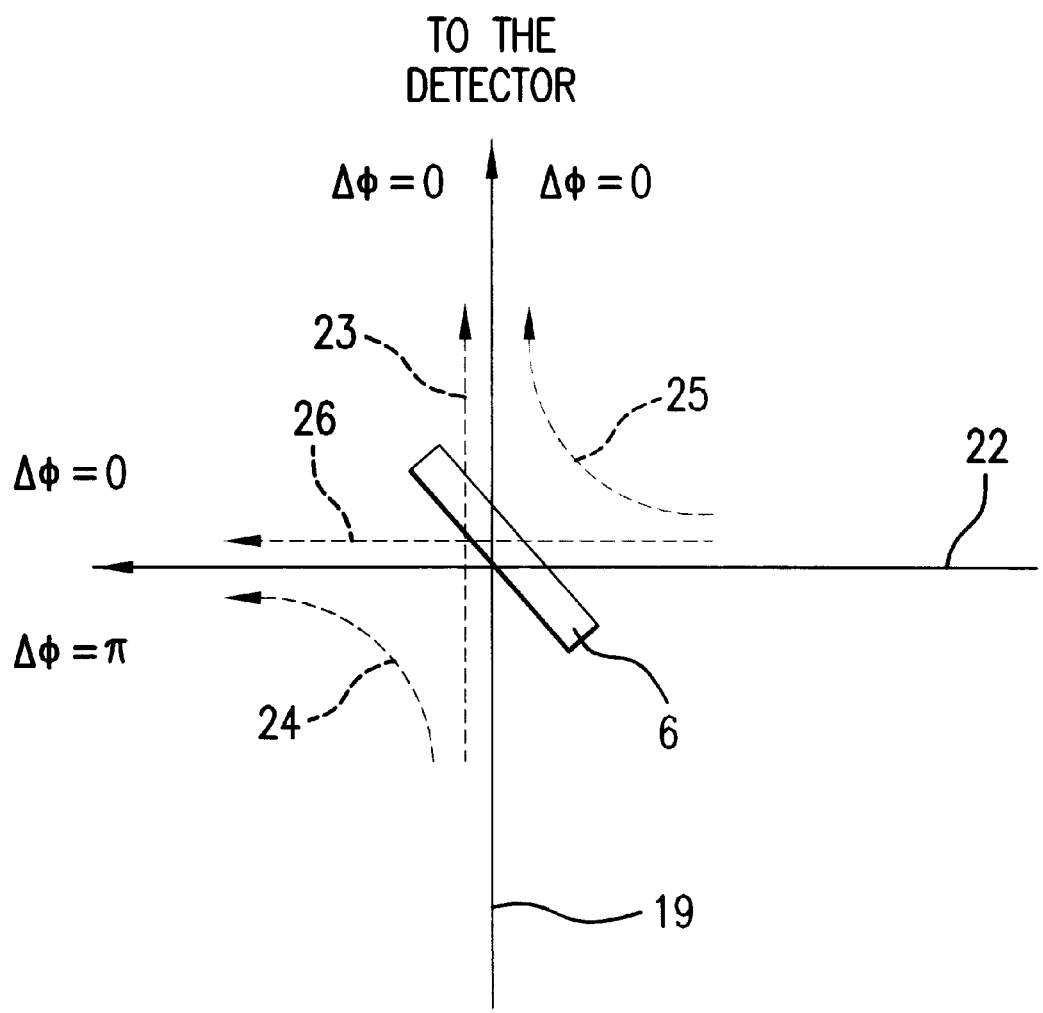
FIG. 3 shows a schematic illustration of the transmission and/or reflection ratios in the case of the component unifying the detection beam path.
Figure 4:
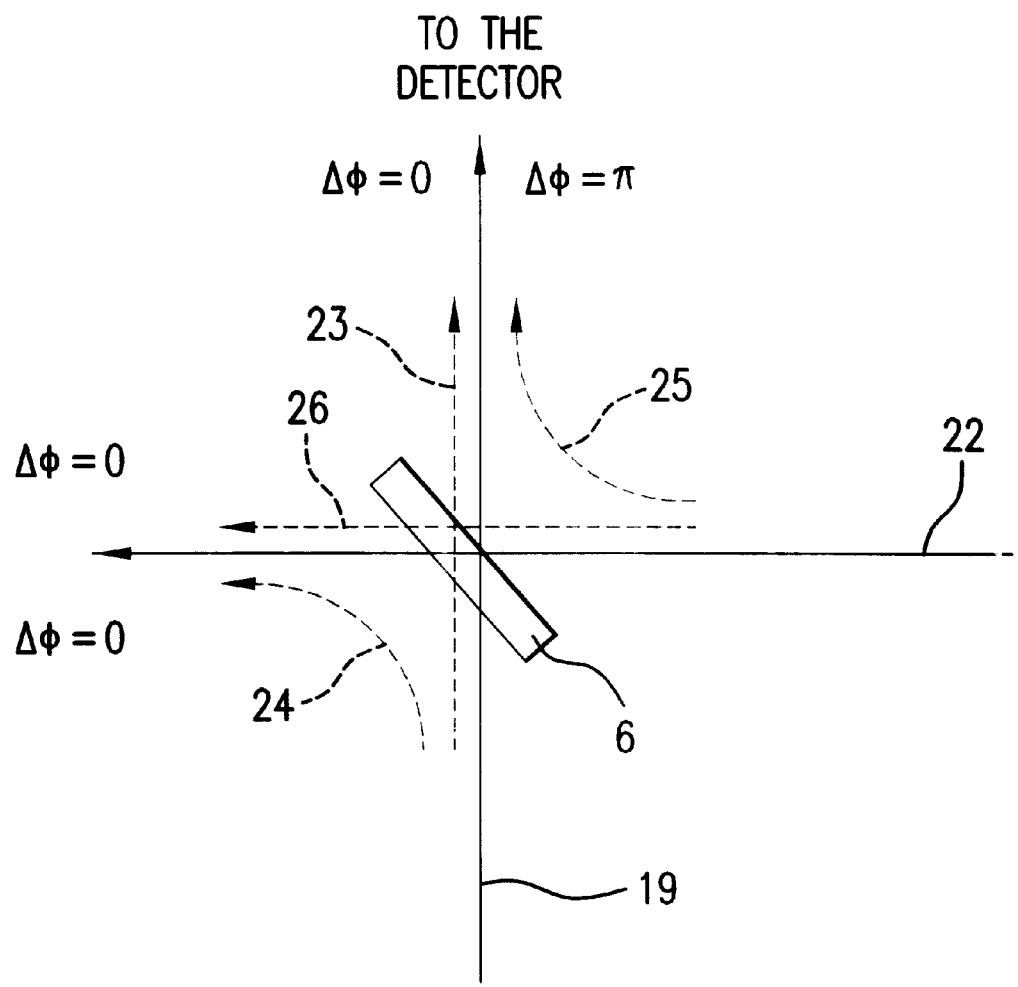
FIG. 4 shows a schematic illustration of the transmission and reflection ratios of the component in FIG. 3, arranged in a mirror-inverted fashion.

It is illustrated schematically in FIG. 3 that the fluorescent light traversing the first and second partial illumination beam 11, 12 experiences a phase jump of 180 degrees at the component 6 only in one case. The two arrows 19, 22 respectively indicate the propagation direction to the detector 5 and the propagation direction of the first and second partial detection beam 27. The fluorescent light traversing the second partial illumination beam 12 exhibits a fraction 23 transmitted through the component 6 and a fraction 24 reflected at the component 6. The fluorescent light traversing the first partial illumination beam 11 exhibits a fraction 25 reflected at the component 6 in the direction of the detector 5, and a fraction 26, transmitted through the component 6, in the direction 22. Only the fraction 24, reflected at the component 6, of the fluorescent light traversing the second partial illumination beam 12 exhibits a phase jump of 180 degrees ($\pi$). The fractions 23, 25, 26 exhibit no phase jump. FIG. 4 shows the same fractions of the fluorescent light 23, 24, 25, 26 coming from the object 1, which are reflected at the component 6 or pass through the component 6. By contrast with FIG. 3, the component 6 is arranged in such a way that its dielectric hybrid layer is assigned to the fractions 25, 26 which traverse the first partial illumination beam 11. Consequently, only the fraction 25 reflected at the component 6 exhibits a phase jump of 180 degrees. In a way according to the invention, the means 20 is to be used to set the phase relationship of the fluorescent light traversing the first and second partial illumination beam 11, 12 in such a way that the fractions 26 transmitted through the component 6 in FIG. 2 and/or the fractions 24 reflected at the component 6 in FIG. 2 are deleted.

It may be pointed out in particular by way of conclusion that the above-discussed exemplary embodiments serve merely to describe the claimed teaching, but do not limit the latter to the exemplary embodiments.

What is claimed is:

1. Optical arrangement for illuminating a fluorescent object with a double confocal scanning microscope, wherein the optical arrangement comprises:

a light source defining an illuminating beam path;

a detector defining a detection beam path, which has a beam cross section active for the detector and encompasses light coming from the object;

a component which splits the illumination beam path into a first and second partial illumination beam and which unifies the detection beam path, wherein the fluorescent light coming from the object in a first and second partial detection beam is united in an at least largely loss-free fashion in an overlapping fashion into one propagation direction at the component; and means for influencing and tuning the phase of the fluorescent light coming from the object, wherein the means is arranged at least in the first or the second partial detection beam, wherein the component which splits the illumination beam path and unifies the detection beam path and the means for influencing and tuning the phase are configured such that fractions of the fluorescent light directed by the component to the detector are maximized and fractions of the fluorescent light not directed to the detector are minimized.

2. Optical arrangement according to claim 1, wherein the component is arranged in the beam path in such a way that light striking the component has an appropriate angle of incidence.

3. Optical arrangement according to claim 2, wherein the component is a component with a metal or dielectric coating.

4. Optical arrangement according to claim 2, wherein the component is a component provided with a dielectric or metal-dielectric hybrid coating.

5. Optical arrangement according to claim 1, wherein the component is configured as a beam splitter arrangement and is arranged in the beam path such that the splitting and recombination ratios for s- and p-polarized light are virtually equal.

6. Optical arrangement according to claim 1, wherein the light coming from the object in a first and second partial detection beam has a defined phase relationship at the interface of the component unifying the light into the detection beam path.

7. Optical arrangement according to claim 6, wherein path lengths of the first and second partial detection beams are defined so that constructive interference of the first and second partial detection beams occurs at the interface of the component, unifying the light into a single detection beam path.

8. Optical arrangement according to claim 1, wherein a double glass wedge is provided as means for influencing the phase of the light coming from the object.

9. Optical arrangement according to claim 1, wherein in the case of the detection of fluorescent light excited by multiphoton excitation processes, a detection pinhole diaphragm is omitted in front of the at least one detector.

10. A double confocal scanning microscope comprises:
a light source defining an illuminating beam path;
two microscope objectives each of which being arranged on opposite sides of an object;
a beam deflecting device for scanning the illuminating beam path across the object in two essentially right angles to one another;
at least one detector defining a detection beam path, which has a beam cross section active for the detector and encompasses light coming from the object;
a component which splits the illumination beam path into a first and second partial illumination beam and which unifies the detection beam path, wherein the fluorescent light coming from the object in a first and second partial detection beam is united in an at least largely loss-free fashion in an overlapping fashion into one propagation direction at the component; and
means for influencing and tuning the phase of the fluorescent light coming from the object, wherein the means is arranged at least in the first or the second partial detection beam,
wherein the component which splits the illumination beam path and unifies the detection beam path and the means for influencing and tuning the phase are configured such that fractions of the fluorescent light directed by the component to the detector are maximized and fractions of the fluorescent light not directed to the detector are minimized.

11. The double confocal scanning microscope according to claim 10, wherein the component is arranged in the beam path in such a way that light striking the component has an appropriate angle of incidence.

12. The double confocal scanning microscope according to claim 11, wherein the component is a component with a metal or dielectric coating.

13. The double confocal scanning microscope according to claim 11, wherein the component is a component provided with a dielectric or metal-dielectric hybrid coating.

14. The double confocal scanning microscope according to claim 10, wherein the component is configured as a beam splitter arrangement and is arranged in the beam path such that the splitting and recombination ratios for s- and p-polarized light are virtually equal.

15. The double confocal scanning microscope according to claim 10, wherein the light coming from the object in a first and second partial detection beam has a defined phase relationship at the interface of the component unifying the light into the detection beam path.

16. The double confocal scanning microscope according to claim 15, wherein path lengths of the first and second partial detection beams are defined so that constructive interference of the first and second partial detection beams occurs at the interface of the component, unifying the light into a single detection beam path.

17. The double confocal scanning microscope according to claim 10, wherein a double glass wedge is provided as means for influencing the phase of the light coming from the object.

18. The double confocal scanning microscope according to claim 10, wherein a detection pinhole diaphragm is arranged upstream of each detector.

19. The double confocal scanning microscope according to claim 10, wherein in the case of the detection of fluorescent light excited by multiphoton excitation processes, a detection pinhole diaphragm is omitted in front of the at least one detector.

20. The double confocal scanning microscope according to claim 10 wherein two mirrors are provided in the first and second partial detection beam and first and second partial illumination beam and the position of at least one mirror is variable.

21. An optical arrangement for illuminating a fluorescent object with a double confocal scanning microscope, wherein the optical arrangement comprises:
a light source defining an illuminating beam path;
a detector defining a detection beam path;
a component which splits the illumination beam path into a first and second partial illumination beam and which unifies the detection beam path, wherein the fluorescent light coming from the object in a first and second partial detection beam is united in an at least largely loss-free fashion in an overlapping fashion into one propagation direction at the component; and
an optical element to alter and tune the phase of the fluorescent light coming from the object, wherein the optical element is disposed in at least one of the first and the second partial detection beam, wherein the component which splits the illumination beam path and unifies the detection beam path and the optical element are configured such that fractions of the fluorescent light directed by the component to the detector are maximized and fractions of the fluorescent light not directed to the detector are minimized.

22. The optical arrangement of claim 21, further comprising:
a controller for varying the phase of light in at least one of the first and second partial detection beams.

23. The optical arrangement of claim 21, wherein path lengths of the first and second partial detection beams are defined so that constructive interference of the first and second partial detection beams occurs at the interface of the component, unifying the light into a single detection beam path.

* * * * *